(12) United States Patent
Murata et al.

(10) Patent No.: US 6,890,009 B2
(45) Date of Patent: May 10, 2005

(54) BUMPER CORE

(75) Inventors: Seishiro Murata, Saitama (JP); Satoru Shioya, Tochigi-ken (JP); Masayuki Fukuda, Kanuma (JP)

(73) Assignee: JSP Corporation (JP)

( * ) Notice: Subject to any disclaimer, the term of this patent is extended or adjusted under 35 U.S.C. 154(b) by 0 days.

(21) Appl. No.: 10/646,761

(22) Filed: Aug. 25, 2003

(65) Prior Publication Data
US 2004/0056491 A1 Mar. 25, 2004

(30) Foreign Application Priority Data

Aug. 28, 2002 (JP) ........................................ 2002-249532
Nov. 15, 2002 (JP) ........................................ 2002-332583

(51) Int. Cl.⁷ .............................................. B60R 19/22
(52) U.S. Cl. ........................ 293/109; 428/71; 188/377
(58) Field of Search ................................ 293/109, 120, 293/122; 428/71; 188/377

(56) References Cited

U.S. PATENT DOCUMENTS

| | | | |
|---|---|---|---|
| 4,504,534 A | 3/1985 | Adachi et al. | ................ 428/71 |
| 4,598,001 A * | 7/1986 | Watanabe et al. | ............. 428/31 |
| 4,756,948 A | 7/1988 | Kuramochi et al. | ........ 428/167 |
| RE32,780 E | 11/1988 | Yoshimura et al. | ....... 428/304.4 |
| 5,340,841 A | 8/1994 | Tokoro et al. | ................ 521/60 |
| 5,747,549 A | 5/1998 | Tsurugai et al. | .............. 521/60 |
| 6,034,144 A | 3/2000 | Shioya et al. | ................. 521/60 |
| 6,451,419 B1 | 9/2002 | Tsurugai et al. | ......... 428/304.4 |
| 2003/0034580 A1 | 2/2003 | Sasaki et al. | ................. 264/51 |
| 2003/0141728 A1 | 7/2003 | Arvelo et al. | ............... 293/133 |
| 2004/0174024 A1 * | 9/2004 | Murata et al. | .............. 293/109 |

FOREIGN PATENT DOCUMENTS

| | | |
|---|---|---|
| CA | 2421888 | 3/2003 |
| EP | 1046546 | 4/1999 |
| JP | H10-81182 | 3/1998 |
| JP | H11-208389 | 8/1999 |
| WO | 03/037971 | 5/2003 |
| WO | 03/078127 | 9/2003 |

* cited by examiner

Primary Examiner—Joseph D. Pape
(74) Attorney, Agent, or Firm—Lorusso & Loud

(57) ABSTRACT

An elongated bumper core of a polyolefin-based resin-containing foam having a density of 0.045–0.2 g/cm³ and showing a compressive load of $F_{20}$ at 20% strain, a compressive load of $F_{40}$ at 40% strain and a compressive load of $F_{60}$ at 60% strain when compressed by a rigid pipe having an outer diameter of 70 mm at a compression speed of 500 mm/minute, wherein the ratio $F_{20}/F_{40}$ is in the range of 0.6–1.3 and the ratio $F_{60}/F_{40}$ is in the range of 0.75–1.3.

18 Claims, 11 Drawing Sheets

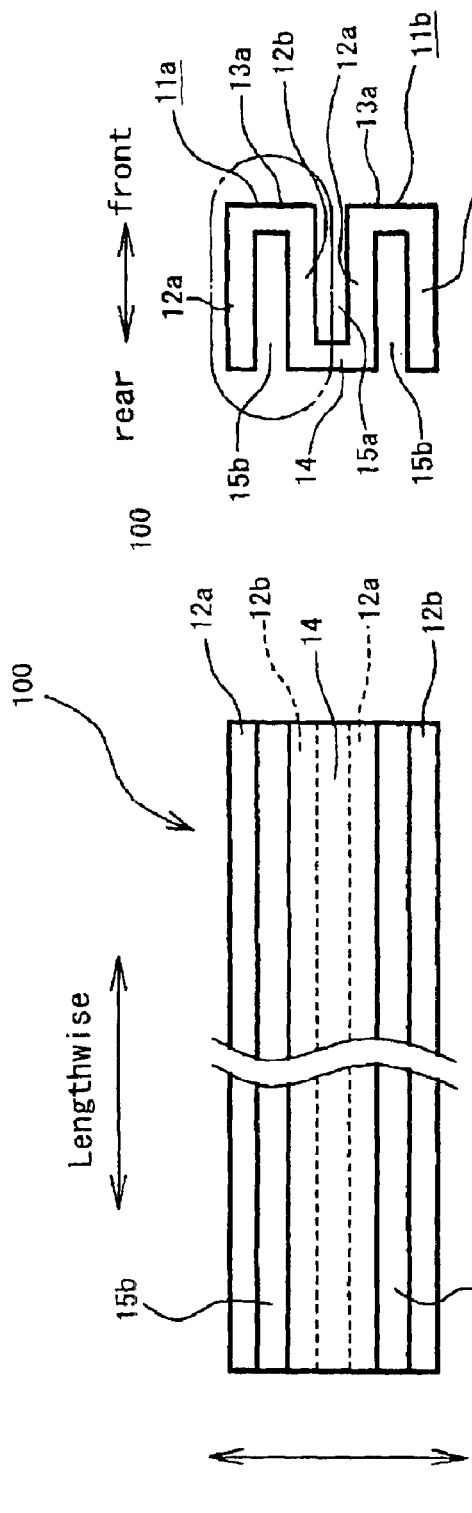
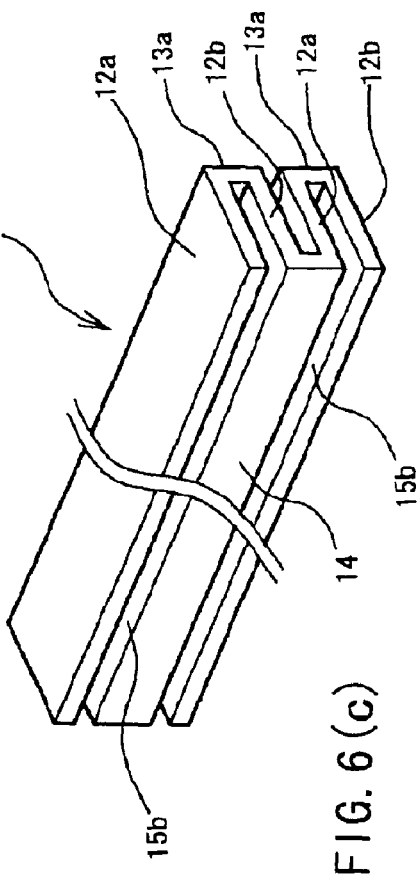
FIG. 6(a)
FIG. 6(b)
FIG. 6(c)

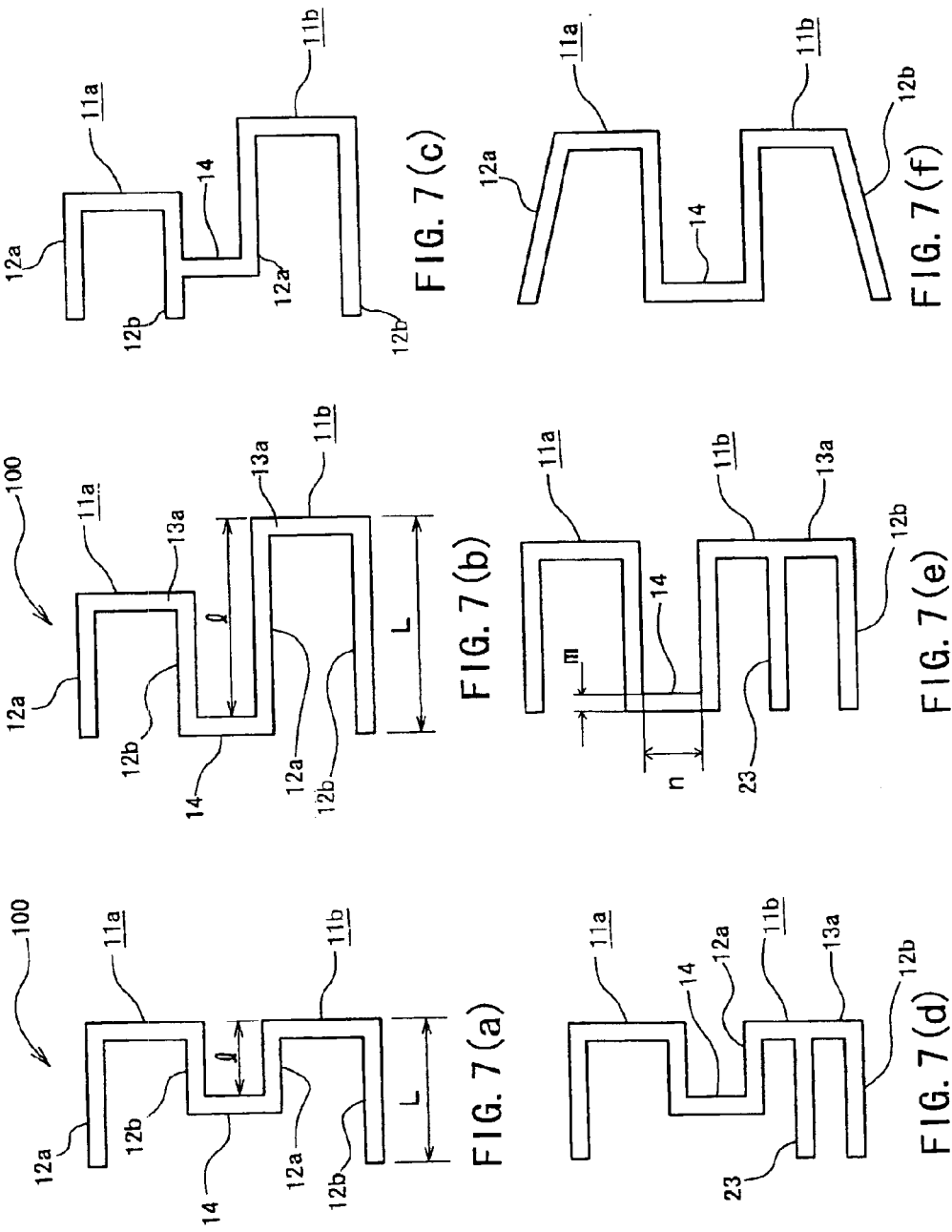

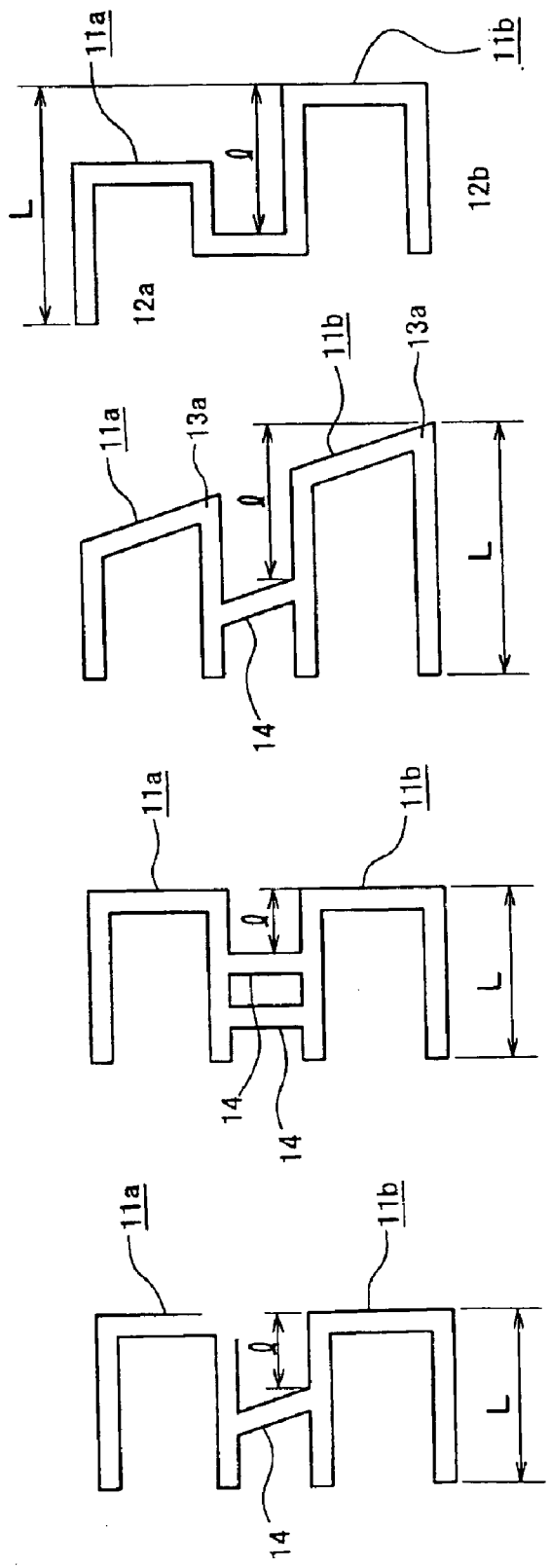

BUMPER CORE

BACKGROUND OF THE INVENTION

This invention relates to a core body of a bumper for attachment to a front of a vehicle such as an automobile.

A front bumper of an automobile generally serves to relax a shock to a driver or passenger and to prevent damages of the automobile body at a time of collision of the automobile with an object. A foamed polypropylene-based resin molding has been used as such a bumper core because of its excellent shock absorbing property and lightness in weight (JP-A-S58-221745 and JP-A-H11-334501).

The conventional front bumpers have been so constructed as to protect an automobile body when the automobile traveling at a speed of 4 or 8 km/hour collides with an object. With such a construction, however, pedestrians are likely to be seriously injured by collision with the bumper of an automobile. In particular, the bumper strikes the knee area of an adult pedestrian, which results in complex, unrecoverable fracture with permanent damage.

Thus, there is an increasing demand for a vehicle front bumper core which can protect a pedestrian on the occasion of collision with an automobile. More specifically, there is a need for a bumper core which can absorb energy of collision between the pedestrian and the automobile traveling at a relatively high speed of, for example, 40 km/hour, so that the leg impact can be reduced and serious knee injury can be avoided.

Even with the conventional bumper core constructions, it is possible to reduce the collision impact and to increase energy absorption by using a core material having a low compression modulus and a large volume. However, since the recent cars are designed to pursue energy saving and an increase of the inside occupation space, the bumper is required to be compact and to have a light weight. At present, no bumper cores on the market satisfy the above requirements at the same time.

SUMMARY OF THE INVENTION

It is an object of the present invention to provide a bumper core for vehicles with which pedestrian protection is considerably improved.

Another object of the present invention is to provide a compact, light weight bumper core which can absorb collision energy in a satisfactory degree.

It is a special object of the present invention to provide a bumper core which can absorb shock of collision between a pedestrian and an automobile traveling at a relatively high speed of, for example, 40 km/hour and which can reduce leg impact on the pedestrian.

In accomplishing the foregoing objects, there is provided in accordance with one aspect of the present invention an elongated bumper core of a polyolefin-based resin-containing foam having a density of 0.045–0.2 g/cm$^3$ and showing a compressive load of $F_{20}$ at 20% strain, a compressive load of $F_{40}$ at 40% strain and a compressive load of $F_{60}$ at 60% strain when compressed by a rigid pipe having an outer diameter of 70 mm at a compression speed of 500 mm/minute, wherein the ratio $F_{20}/F_{40}$ is in the range of 0.6–1.3 and the ratio $F_{60}/F_{40}$ is in the range of 0.75–1.3.

In another aspect, the present invention provides an elongated bumper core of a polyolefin-based resin-containing foam having a density of 0.045–0.2 g/cm$^3$, comprising a front section extending lengthwise of said bumper core, and at least two, longitudinally extending, vertically spaced apart protrusions each extending rearwardly from said front section, wherein each of said protrusions has a thickness in the vertical direction of T mm and a length in the front to rear direction of H mm, wherein the ratio of H/T is 2 to 10, wherein the polyolefin-based resin-containing foam from which said protrusions are formed has a bending load of 35–400 N, said bumper core having a true volume VT cm$^3$ and including one or more weight reducing portions having a total volume of VV cm$^3$, wherein VT and VV satisfy the following condition:

$$0.2 \leq VT/(VT+VV) \leq 0.7.$$

In a further aspect, the present invention provides an elongated bumper core of a polyolefin-based resin-containing foam having a density of 0.045–0.2 g/cm$^3$, comprising at least two, vertically spaced apart U-shaped sections each formed by a vertical front wall extending lengthwise of said bumper core and at least two legs extending longitudinally and also rearwardly from said vertical front wall to define between adjacent two legs a space which is open rearwardly; and an interconnecting section connecting adjacent two legs of each of the two adjacent U-shaped sections at a position spaced apart rearwardly from at least one of said front walls of said adjacent two U-shaped sections so that the U-shaped sections are interconnected together into a unitary structure.

The present invention also provides a bumper for attachment to a front of a vehicle, comprising a bumper fascia, the above bumper core having a front side attached to said bumper fascia, and a reinforcement to which a rear side of the bumper core is attached.

BRIEF DESCRIPTION OF THE DRAWINGS

Other objects, features and advantages of the present invention will become apparent from the detailed description of the preferred embodiments of the invention which follows, when considered in the light of the accompanying drawings in which:

FIG. 6(a) is a vertical elevational view diagrammatically illustrating another embodiment of a bumper core according to the present invention;

FIG. 6(b) is a side view of FIG. 6(a);

FIG. 6(c) is a perspective view of the bumper core of FIG. 6(a);

FIGS. 7(a) through 7(j) are side views similar to FIG. 6(b), showing various modifications of the bumper core of FIG. 6(b);

DETAILED DESCRIPTION OF THE PREFERRED EMBODIMENTS OF THE INVENTION

The elongated bumper core of the present invention is made of a polyolefin-based resin-containing foam and shows a compressive load of $F_{20}$ at 20% strain, a compressive load of $F_{40}$ at 40% strain and a compressive load of $F_{60}$ at 60% strain when compressed by a rigid pipe having an outer diameter of 70 mm at a compression speed of 500 mm/minute. It is important that the ratio $F_{20}/F_{40}$ should be in the range of 0.6–1.3 and the ratio $F_{60}/F_{40}$ should be in the range of 0.75–1.3.

Figure 1:
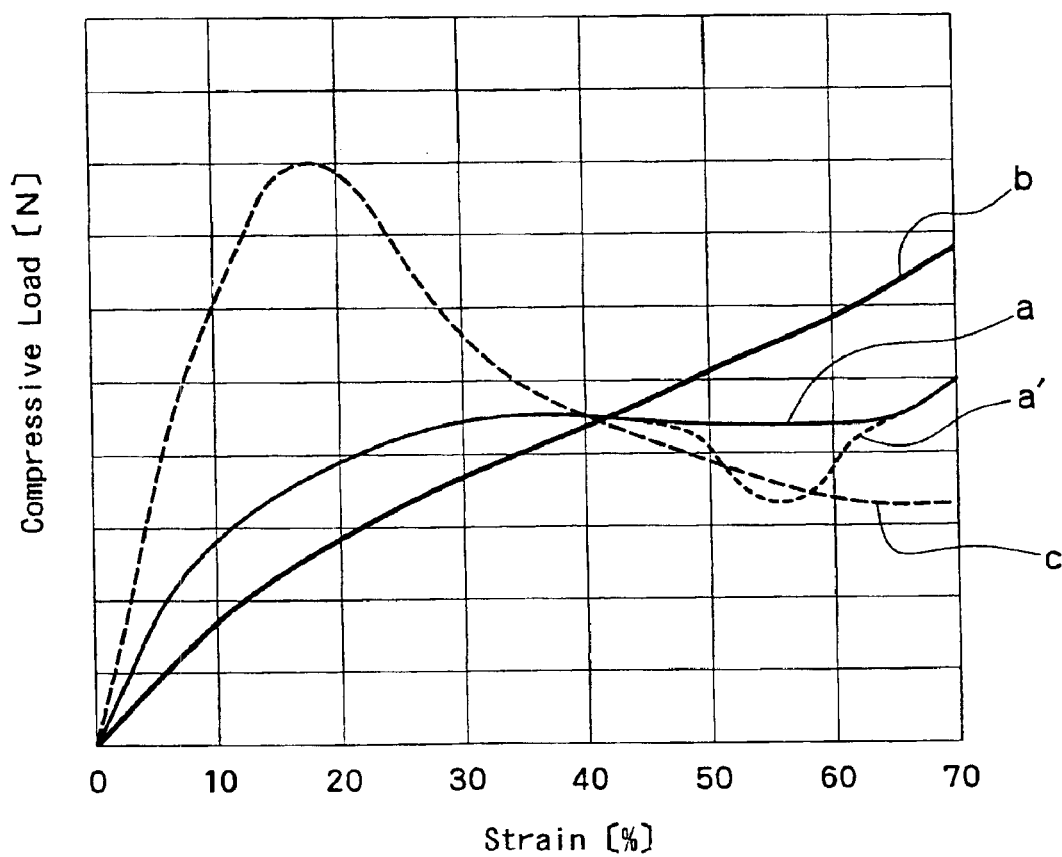
FIG. 1 shows compression curves of a bumper core of the present invention (curve a) and known bumper cores (curves b and c)

When the ratios $F_{20}/F_{40}$ and $F_{60}/F_{40}$ fall within the above ranges, the bumper core typically shows a strain-stress curve "a" shown in FIG. 1. Because of the presence of such a "flat" portion in the strain-stress curve "a" between the 20% strain and the 60% strain, the compressive load initially greatly changes in the 0–20% strain range. In the 20% to 60% strain range, however, the change in compressive load is small. Thus, the collision energy can be absorbed in the flat portion. Further, the compressive loads in the flat portion do not greatly exceed the compressive load $F_{40}$ at the 40% strain.

More specifically, when the ratio $F_{20}/F_{40}$ is less than 0.6, an increase of the compressive load in the initial, low strain range is so small as shown by the curve "b" in FIG. 1 that the collision energy cannot be sufficiently absorbed. On the other hand, when the ratio $F_{20}/F_{40}$ is greater than 1.3, a peak appears in a low strain region as shown by the curve "c" in FIG. 1. When the peak is high as shown in FIG. 1, the leg stress is so high that there is a great possibility that the leg is seriously damaged. When the peak is low, the collision energy cannot be sufficiently absorbed and the leg cannot be sufficiently protected. For reasons of sufficient protection of the leg and sufficient absorption of the collision energy, the ratio $F_{20}/F_{40}$ is preferably in the range of 0.75–1.3, more preferably in the range of 0.8–1.2, most preferably in the range of 0.85–1.1.

When the ratio $F_{60}/F_{40}$ is less than 0.75, the compressive load decreases relatively rapidly at the strain of 40% or more, resulting in a failure to absorb the collision shock sufficiently. Further, since the strain-stress curve will finally abruptly increase by the applied collision energy, the leg impact increases considerably to cause serious injury. When the ratio $F_{60}/F_{40}$ exceeds 1.3, strain-stress curve increases so rapidly at the strain range of $F_{40}$ to $F_{60}$ that the leg cannot be sufficiently protected from collision impact. For reasons of sufficient protection of the leg and sufficient absorption of the collision energy, the ratio $F_{60}/F_{40}$ is preferably in the range of 0.8–1.2, more preferably in the range of 0.85–1.15, still more preferably 0.98–1.15, most preferably 1.0–1.1.

It is preferred that the compressive load $F_{40}$ at the 40% strain be in the range of 1–6 kN, more preferably 2–5 kN, for reasons of sufficient absorption of the collision energy and sufficient protection of the leg from the collision impact. For the same reasons, the compressive load $F_{20}$ at the 20% strain is preferably in the range of 0.7–6 kN, more preferably 2–5 kN, while the compressive load $F_{20}$ at the 60% strain is preferably in the range of 1–6 kN, more preferably 2–6 kN.

As used herein, the compression curve is intended to refer to plots of the compressive load as a function of the strain obtained in a compression test in which the core is compressed by a rigid pipe having an outer diameter of 70 mm at a compression speed of 500 mm/minute. The compression test is carried out at 23° C. under a relative humidity of 50%. The pipe diameter of 70 mm is selected as an approximate diameter of an adult leg.

The compression test method will be described in detail below with reference to FIGS. 2(a) and 2(b) which are front and side views, respectively, schematically illustrating a specimen 1 of a core under the compression test. The specimen 1 in the illustrated case is obtained by laterally cutting an elongated core 10 shown in FIGS. 3(a) and 3(b) into a length "d" of 17 cm. Thus, the specimen 1 has a length "d" along the lengthwise direction of the core 10 of 17 cm, a length "t" along the front-to-rear direction of the core 10 and a length "h" along the vertical direction of the core 10, the length "h" being the same as or smaller than a vertical length of a front surface of a reinforcement (designated as 19 in FIG. 4 and described hereinafter) to which the core 10 is attached. In sampling, each of the longitudinal end portions having a longitudinal length equal to 15% of the total length of the core 10 is removed. Further, those regions of the core 10 which correspond to the locations of winkers and headlamps and which have special shapes are removed. Additionally, upper and lower portions of the core 10 which protrude from the upper and lower edges of a reinforcement, if any, are removed. From the remaining core (essential part of the core), as large a number of specimens as possible are produced and each specimen is subjected to the compression test.

Figure 2A:
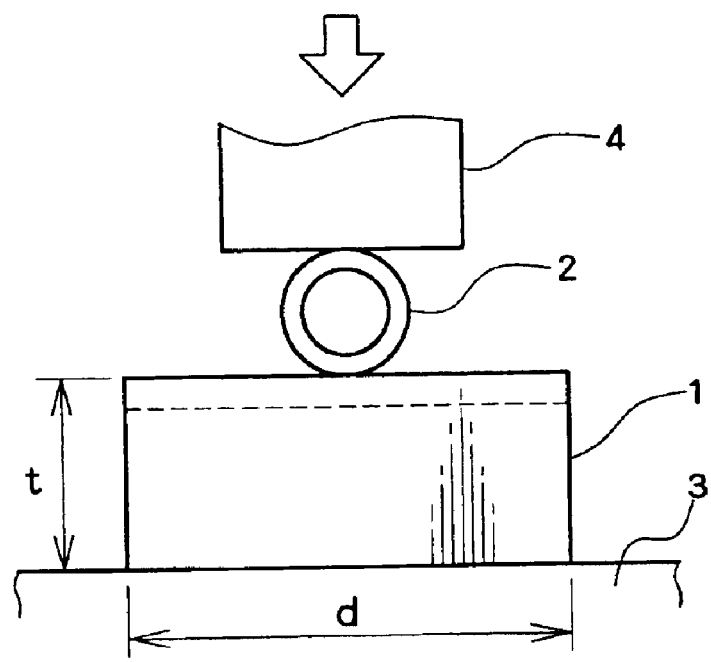
FIG. 2(a) is a front elevational view schematically illustrating a compression test method.
Figure 2B:
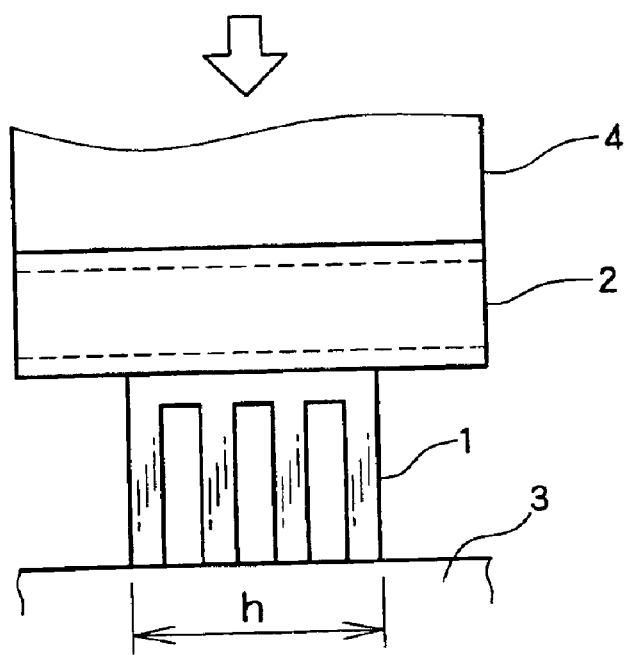
FIG. 2(b) is a side view of FIG. 2(a)

In FIGS. 2(a) and 2(b), designated as 3 is a rigid supporting table having a flat surface to which a #40 sand paper 5 is bonded with its rough surface being upwardly facing surface. The specimen 1 is placed on the table 3 such that the rear side of the core is in contact with the rough surface of the sand paper 5. Then, the rigid pipe 2 having an outer diameter of 70 mm is placed on the specimen such that the axial direction of the pipe 2 is oriented normal to the lengthwise direction of the specimen. A compression device 4 is operated to lower the pipe 2 so that the specimen is compressed in the front-to-rear direction at a compression speed of 500 mm/minute. The compression is conducted, while recording the applied load and the height of the specimens, until each specimen is compressed by 70%, i.e. until the length "t" is reduced to 0.3t. From the thus obtained compression curve, a compressive load of $F_{20}$ at 20% strain, a compressive load of $F_{40}$ at 40% strain and a compressive load of $F_{60}$ at 60% strain are determined for each specimen. Then, an average of the compressive loads of the specimens is calculated for each of $F_{20}$, $F_{40}$ and $F_{60}$, from which $F_{20}/F_{40}$ and $F_{60}/F_{40}$ of the core are determined.

The elongated core of the present invention extends lengthwise, i.e. in the longitudinal direction, which is in parallel with the lateral direction of a vehicle such as an automobile to which the bumper is attached to a front of the vehicle. The elongated core also extends in a front-to-rear direction of the core. The front-to-rear direction of the core is perpendicular to the lengthwise direction thereof and is in parallel with the front-to-rear direction of the vehicle. The maximum length L of the core along the front-to-rear direction is generally 15 cm or less, preferably 3–15 cm, more preferably 4–12 cm. Too large a maximum length L of the core in excess of 15 cm is not advantageous, because the front-to-rear length of the vehicle undesirably increases.

Figure 3A:
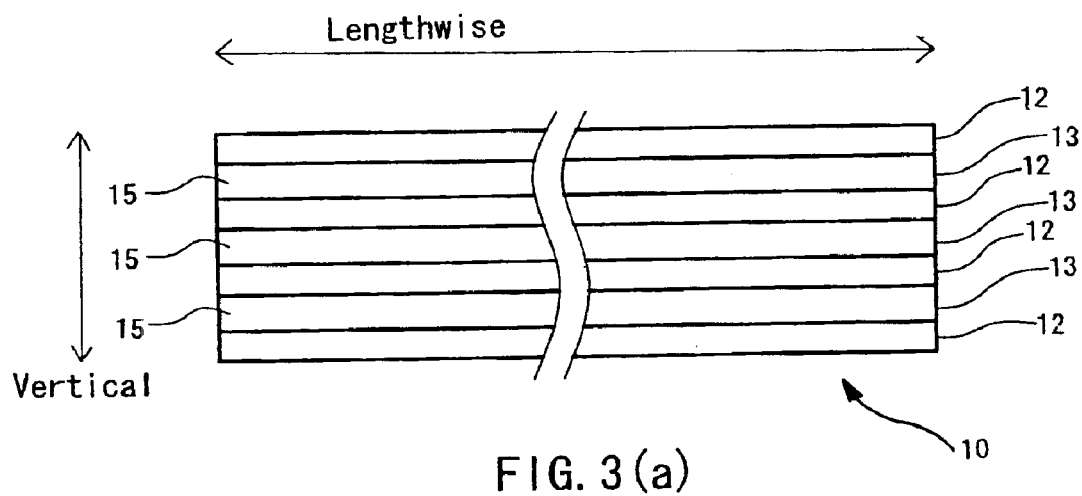
FIG. 3(a) is a vertical elevational view diagrammatically illustrating one embodiment of a bumper core according to the present invention.
Figure 3B:
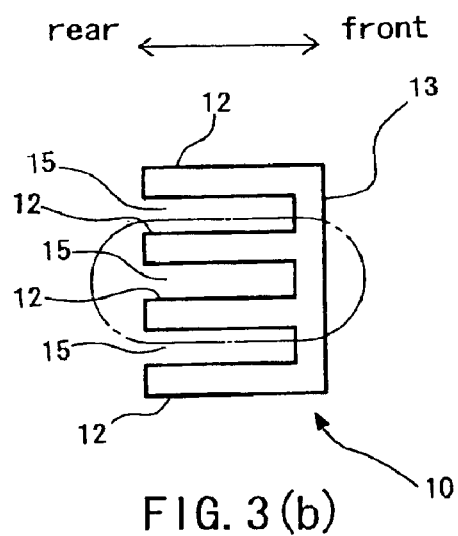
FIG. 3(b) is a side view of FIG. 3(a)

The bumper core having the above-described $F_{20}/F_{40}$ and $F_{60}/F_{40}$ characteristics may be embodied in various forms. One preferred embodiment of an elongated bumper core according to the present invention is illustrated in FIGS. 3(a) and 3(b). Generally designated as 10 is an elongated bumper core having a front section 13 extending lengthwise of the bumper core 10, and at least two, longitudinally extending, vertically spaced apart protrusions 12 each extending rearwardly from the front section 13. In the illustrated embodiment, the front section 13 is a vertical wall extending lengthwise of the bumper core 10 and also vertically, while the protrusions 12 are four, parallel plate-like legs extending rearwardly from and perpendicularly to the vertical wall 13 and extending also lengthwise of the bumper core 10 to define a space 15 between each of the adjacent two legs 12.

The space 15 between adjacent two legs 12 and 12 constitutes weight reducing portions which define air space or plenum and in which only air is present. Recesses, holes and/or grooves, when formed in the front walls 13 and/or legs 12 also constitute such weight reducing portions. Because of the presence of the weight reducing portion 15, when the bumper core 10 as shown in FIGS. 3(*a*) and 3(*b*) is compressed in the front-to-rear direction, the legs 12 first begin deflecting and buckling. Further compression of the bumper core 10 causes breakage as well as further buckling of the legs. Thus, the core 10 continues to deform until the weight reducing portions (air space) are filled with the buckled or broken legs. As long as the legs continue to buckle and break roughly, the compressive load does not greatly increase.

Therefore, in the above-described compression curve shown in FIG. 1, there appears a flat portion between the 20% strain and the 60% strain in which the compressive load does not greatly change. The compressive load $F_{40}$ at 40% strain increases with an increase of the strength of the legs 12. Thus, by controlling the density of core, the bending strength of the legs and the volume of the weight reducing portions, it is possible to control the compressive load and strain of the flat portion of the compression curve. When an automobile, to which a front bumper bearing the bumper core of the present invention having the above compression curve characteristics is attached, collides with an object, the energy of collision can be absorbed while reducing the collision impact on the object.

It is preferred that the volume, VV cm$^3$, of the weight reducing portion (air space) 15 and the true volume, VT cm$^3$, of the bumper core 10 satisfy the following condition:

$$0.2 \leq VT/(VT+VV) \leq 0.7$$

for reasons of satisfactory absorption of the energy of collision and reduced collision impact. For example, when the volume VV of the weight reducing portion 15 is excessively large, namely when the legs 12 are excessively thin or excessively long, the ratio VT/(VT+VV) becomes so small that there is a possibility that the legs are vigorously crushed into fragments at a time of collision and that the compressive load abruptly decreases at 40–60% strain. There is also a possibility that the collision impact cannot be absorbed sufficiently and that the compressive load considerably increases before the strain of 70% is reached. On the other hand, when the volume VV of the weight reducing portion 15 is excessively small, namely when the legs 12 are excessively thick or excessively short, the ratio VT/(VT+VV) becomes so large that there is a possibility that the compression curve is as shown in the curve "b" in FIG. 1 and that the collision energy cannot be absorbed sufficiently and that the collision impact cannot be sufficiently reduced. More preferably, the ratio VT/(VT+VV) is between 0.2 and 0.6. Still more preferably, the ratio VT/(VT+VV) is between 0.2 and 0.5. Most preferably, the ratio VT/(VT+VV) is between 0.25 and 0.45.

The true volume VT of the bumper core 10 may be determined by measuring the dimensions thereof or, alternatively, by an immersion method in which a specimen is immersed in water to measure a difference between the water levels before and after the immersion from which the volume VT can be determined. The volume VV of the weight reducing portion 15 may be determined by measuring the dimensions thereof. In an alternative, the volume (VT+VV) is first measured from the dimensions of the core 10. By subtracting the volume VT as measured by the immersion method from the measured volume (VT+VV), the volume VV may be determined.

Figure 4:
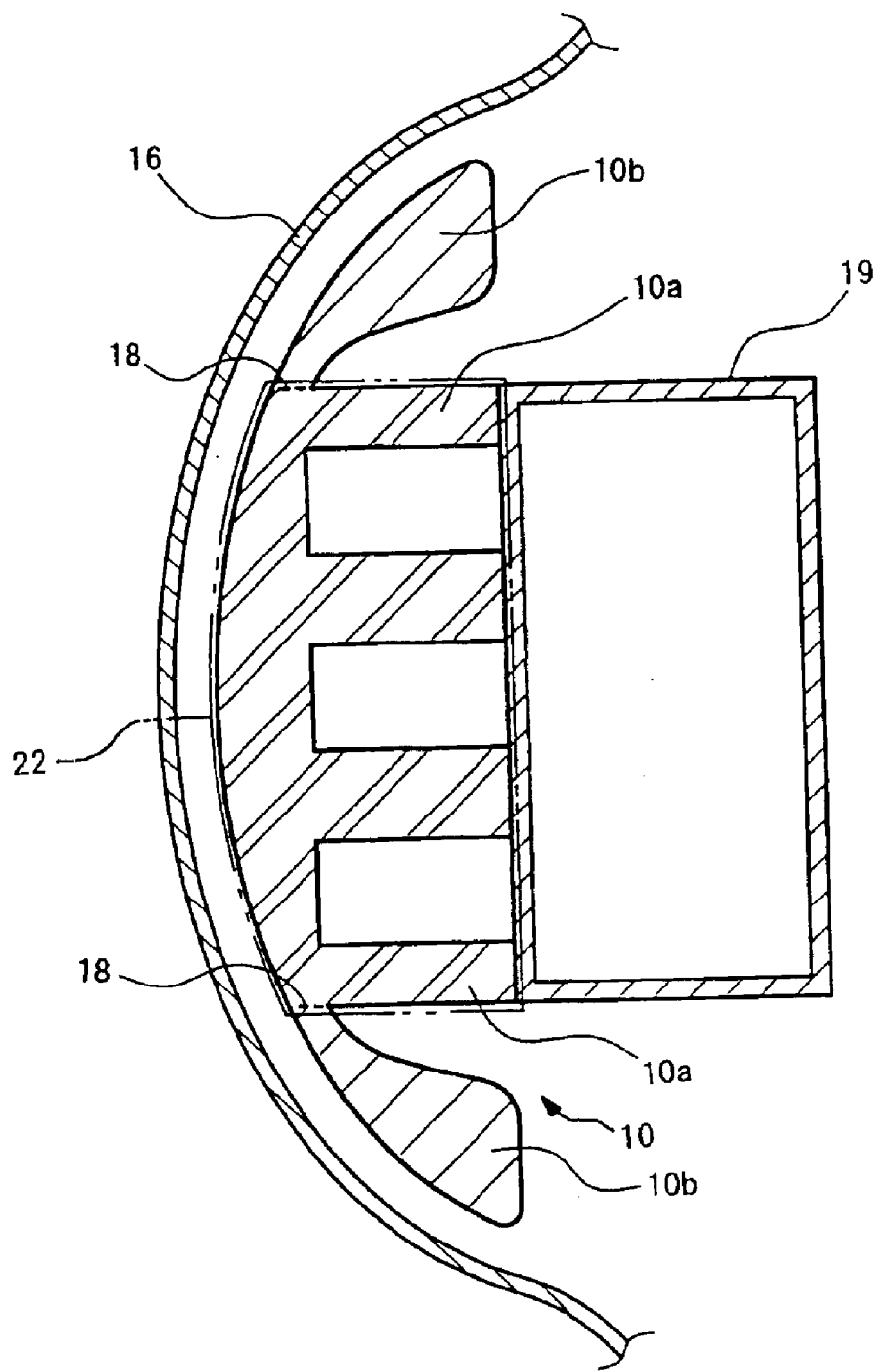
FIG. 4 is a lateral cross-sectional view diagrammatically illustrating one example of a bumper structure of the present invention.

The volumes VT and VV of the core under consideration are those of the essential part of the core. Thus, upper and lower portions of the core 10 which protrude from the upper and lower edges of a reinforcement, if any, are removed from the consideration. Additionally, those regions of the core 10 which correspond to the locations of winkers and headlamps and which have special shapes are not taken in account. Further, each of the longitudinal end portions having a longitudinal length equal to 15% of the total length of the core 10 is not taken in account. For example, as shown in FIG. 4, upper and lower portions 10*b* of the core 10 which protrude from the upper and lower edges of a reinforcement 19 and which are non-essential parts of the core are removed for the measurement of VT and VV. Only the essential part 10*a* as surrounded by the two-dotted line 22 in FIG. 4 is measured for VT and VV. The dotted lines 18 show upper and lower planes which are coplanar with the upper and lower surfaces of the reinforcement 19 and which represent boundaries between the essential part 10*a* and non-essential part 10*b*. FIG. 4 depicts an embodiment of a front bumper having a bumper fascia 16, the reinforcement 19 attached to a body of a vehicle, and the bumper core 10 interposed between the fascia 16 and the reinforcement 19 and secured to the reinforcement 19. Incidentally, the volume VV of the weight reducing portion is the volume of the air space within an imaginary flexible package (designated as 22) enclosing the outer periphery of the essential part of the core 10.

It is preferred that at least one of the legs 12 of the core have a ratio (H/T) of the length, H mm, in the front to rear direction to the thickness, T mm, in the vertical direction of 2 to 10, more preferably 3–8, most preferably 3–6. When the ratio H/T is excessively small, namely when the thickness T is excessively large or the length H is excessively small, there is a possibility that the compression curve is as shown in the curve "b" in FIG. 1 and that the collision energy cannot be absorbed sufficiently and the collision impact cannot be sufficiently reduced. On the other hand, when the ratio H/T is excessively large, namely when the thickness T is excessively small or the length H is excessively large, there is a possibility that the legs are vigorously crushed into fragments at a time of collision and that the compressive load abruptly decreases at 40–60% strain. There is also a possibility that the collision impact cannot be absorbed sufficiently and that the compressive load considerably increases before the strain of 70% is reached. The length H is preferably 20–100 mm, more preferably 25–70 mm.

Figure 5:
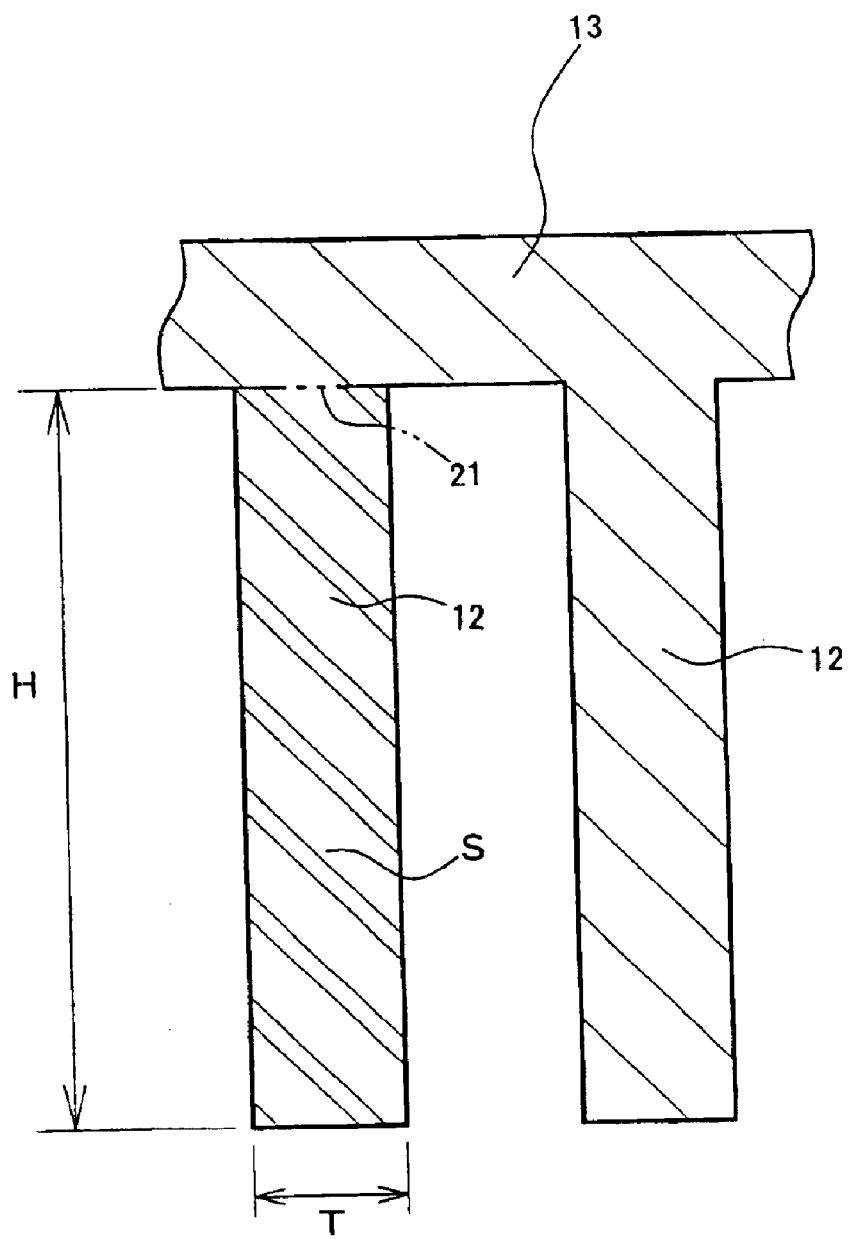
FIG. 5 is an enlarged fragmentary view of a portion of the bumper core shown in FIG. 3(b)

As shown in FIG. 5 which is an enlarged partial view of a portion surrounded by the one-dotted line in FIG. 3(*b*), the length H of the leg 12 is a length from the base position 21 to a rear end of the leg 12. The thickness T of the leg 12 is a value obtained by dividing the cross-sectional area S (mm$^2$) by the length H (T=S/H). The cross-sectional area S is an area of the portion indicated by the double line hatching in FIG. 5. It is possible that the H and/or T of the leg 12 vary along the longitudinal length of the core, i.e. along the longitudinal length of the leg 12. Further, it is possible that the leg 12 has a portion in which the ratio H/T does not fall within the above-described range. In such a case, however, it is preferred that the ratio H/T of the leg 12 fall within the above-described range in at least 60% of the longitudinal length thereof.

It is also preferred that the polyolefin-based resin-containing foam from which the legs 12 are formed have a bending load BF of 35–400 N, more preferably 35–200 N, most preferably 70–200 N, for reasons of obtaining a suitable compressive load ratio $F_{20}/F_{40}$, $F_{60}/F_{40}$ and a compressive load $F_{40}$. The bending load BF of the polyolefin-based resin-containing foam is measured by 3-point bending test in accordance with the method and conditions described in the Japanese Industrial Standard JIS K 7221 (1984) in terms of the maximum bending load. Thus, the specimen has a length of 120 mm, a width of 25 mm and a height of 20 mm. The specimen may be sampled from the leg of the essential part of the core 10. The same polyolefin-based resin-containing foam as used in the leg may be used as a specimen, if available.

It is further preferred that at least one of the legs has a bending load BL of 5–150 N, more preferably 25–75 N, most preferably 30–70 N, for reasons of obtaining a suitable compressive load ratio $F_{20}/F_{40}$, $F_{60}/F_{40}$ and a compressive load $F_{40}$. The bending load BL of the leg is measured by 3-point bending test in accordance with the method and conditions described in the Japanese Industrial Standard JIS K 7221 (1984) in terms of the maximum bending load. However, the specimen should have a length of 120 mm and a width and a thickness of the leg as such. In the case of the leg 12 shown in FIG. 5, for example, a specimen is obtained by cutting the core along the line 21 and along the front-to-rear direction of the core such that the specimen has a length of 120 mm, a width of H and a thickness of T. The lengthwise direction of the specimen sampled is in parallel with the lengthwise direction of the core. The specimen thus obtained is subjected to the 3-point bending test as such, even when it has one or more tapered surfaces.

It is desired that at least one of the legs 12 of the core have the H/T ratio, the bending loads BF and BL in the above ranges. It is more preferred that at least four legs 12 of the core meet with the these criteria. It is most preferred that each of the legs 12 of the core meet with the these criteria.

The front wall 13 may have any desired shape such as flat, concave, convex or undulated form to coincide with a rear surface of a bumper fascia 18. If desired, the front wall 13 may be provided with one or more through holes, recesses or bores to form a part of the weight reducing portion of the core 10. The thickness and shape of the legs 12 may be suitably determined with due consideration of the compressive strength at an initial stage of collision (at low strain region) and easiness in preparation of the core such as moldability and mold releasability. For example, in the legs shown in FIG. 5, the thickness of leg 12 in the base position 21 may be greater than that in the rear end of the leg.

Another preferred embodiment of an elongated bumper core according to the present invention is illustrated in FIGS. 6(a) through 6(c). The elongated bumper core, generally designated as 100, in the illustrated embodiment has two vertically spaced apart U-shaped sections 11a and 11b each formed by a vertical front wall 13a extending lengthwise of the bumper core and two legs 12a and 12b extending longitudinally and also rearwardly from the vertical front wall 13a to define between adjacent two legs 12a and 12b a space 15b which is open rearwardly. Designated as 15a is a space between the adjacent U-shaped sections 11a and 11b.

The bumper core 100 also has an interconnecting section 14 connecting adjacent two legs 12b and 12a of each of the two adjacent U-shaped sections 11a and 11b at a position spaced apart rearwardly from at least one of the front walls 13a of the U-shaped sections 11a and 11b so that the U-shaped sections 11a and 11b are interconnected together into a unitary structure.

Various modifications may be made to the bumper core 100 shown in FIGS. 6(a) to 6(c). For example, the number of the U-shaped sections may be changed if desired. Thus, the number of the U-shaped sections 11a and 11b is preferably 2–5, more preferably 2–3, most preferably 2. Further, as shown in FIGS. 7(a) through 7(j), the number of the legs in each U-shaped section, the orientation of the front walls, the orientation of the legs and position and orientation of the interconnecting section may be changed as desired. The various modifications shown will be described in more detail below. In FIGS. 6(a) to 6(c) and FIGS. 7(a) to 7(j), the same reference numerals designate similar component parts.

In the embodiment shown in FIG. 7(a), the adjacent two legs 12b and 12a of the U-shaped sections 11a and 11b are shorter than the other legs. In the core of FIG. 7(b), the two legs 12a and 12b of the upper U-shaped section 11a are shorter than those of the lower U-shaped section 11b, and the vertical front walls 13a of the U-shaped sections 11a and 11b are not coplanar. The core shown in FIG. 7(c) differs from that of FIG. 7(b) in that the leg 12a of the lower U-shaped section 11b is shorter than that of the leg 12b thereof and in that the interconnecting section 14 extends between the rear end of the leg 12a of the lower U-shaped section 11b and an intermediate portion of the leg 12b of the upper U-shaped section 11a. In the embodiments shown in FIGS. 7(d) and 7(e), each of the U-shaped sections 11a and 11b has an additional legs 23 extending longitudinally and also rearwardly from the vertical front wall 13a to divide the space 15b into two sub-spaces. The number of the additional legs 23 in each of the U-shaped sections is generally 0–6, preferably 0–2, more preferably 0–1.

The legs 12a and 12b in the foregoing embodiments extend in parallel with each other. If desired, the legs may extend at a suitable angle. One example of such a non-parallel legs arrangement is illustrated in FIG. 7(f), in which the legs 12a and 12b extend rearwardly outwardly. The legs 12a and 12b may also extend inwardly. However, it is preferred that the legs 12a and 12b extend in parallel with each other.

The interconnecting section 14 in the foregoing embodiments extend in parallel with the front walls 13a. If desired, however, the interconnecting section may not be in parallel with the front walls 13a as shown in FIG. 7(g). Two or more interconnecting sections 14 may be provided as shown in FIG. 7(h), if desired. The front wall 13a in the foregoing embodiments extend in the direction normal to the front-to-rear direction of the core 100. If desired, however, the front wall 13a of one or more U-shaped sections may extend obliquely as shown in FIG. 7(i).

In the foregoing embodiments, the rear end of the top leg 12a of the upper U-shaped section 11a and the rear end of the lower leg 12b of the lower U-shaped section 11b are located in the same rearmost plane which is normal to the front-to-rear direction of the core 100. If desired, as shown in FIG. 7(j), the rear end of the lower leg 12b of the lower U-shaped section 11b may not be located in the rearmost plane in which the rear end of the top leg 12a of the upper U-shaped section 11a is located. It is, however, preferred that the rear ends of the legs 12a and 12b of the U-shaped sections 11a and 11b be located in the same rearmost plane as in the embodiments of FIGS. 7(b), 7(e), 7(f), 7(g), 7(h) and 7(i).

The space 15b defined between the legs 12a and 12b and the space 15a defined between the two U-shaped sections 11a and 11b (see FIGS. 6(a) to 6(c)) constitute weight reducing portions which define air space or plenum and in which only air is present. Recesses, holes and/or grooves, when formed in the front walls 13a, legs 12a and 12b and/or interconnecting section 14, also constitute such weight reducing portions. Because of the presence of the weight reducing portions 15b and 15a, in the above-described compression curve shown in FIG. 1, there appears a flat portion between the 20% strain and the 60% strain in which the compressive load does not greatly change. Thus, by controlling the density of core, the bending strength of the legs and the volume of the weight reducing portions, it is possible to control the compressive load and strain of the flat portion of the compression curve.

In the embodiments shown in FIGS. 6(a) to 6(c) and FIGS. 7(a) to 7(j), the interconnecting section 14 connects adjacent two legs 12b and 12a of each of the two adjacent U-shaped sections 11a and 11b at a position spaced apart rearwardly from the front walls 13a. It is preferred that the interconnecting section 14 be located at a position spaced apart from the foremost plane a distance equal to at least one thirds, more preferably at least a half, still more preferably at least three quarters of the distance between the foremost plane and the rearmost plane.

The term "rearmost plane" as used herein is intended to refer to the plane which is normal to the front-to-rear direction of the core 100 and in which at least one of the rearmost ends of the legs 12a and 12b is located. The term "foremost plane" as used herein is intended to refer to the plane which is in parallel with the rearmost plane and in which at least one of the foremost ends of the front walls 13a is located. The terms "distance between the foremost plane and the rearmost plane" is thus the maximum length of the core 100 in the front-to-rear direction and is indicated by L in FIGS. 7(a), 7(b) and 7(g) to 7(j). Thus, the location of the interconnecting section 14 is preferably such that the length l between the foremost plane and the front face of the interconnecting section 14 (see FIGS. 7(a), 7(b) and 7(g) to 7(j)) is at least L/3 (l≧L/3), more preferably at least L/2, still more preferably at least 3L/4. Most preferably, the position of the interconnecting section 14 is such that the rear face thereof is located in the rearmost plane as shown in FIGS. 6(b), 7(b), 7(e) and 7(f).

As described above, when the bumper core 100 having the weight reducing portions (air space) 15b and 15a is compressed in the front-to-rear direction, the legs 12a and 12b first begin deflecting and buckling, and the core 100 continues to deform until the weight reducing portions are filled with the buckled or broken legs. As long as the legs continue to buckle and break roughly, the compressive load does not greatly increase. Therefore, as shown by the curve "a" in FIG. 1, the compression curve of the bumper core 100 shows a flat portion between 20% strain and 60% strain in which the compressive load does not greatly change. When the buckling and breakage of the legs terminate very quickly within a short period of time, on the other hand, there may appear a collapse in the compression curve as shown by the curve a' on rare occasions. Such an undesirable collapse of the compression curve can be avoided by controlling the position of the interconnecting section 14 as described above.

For example, by increasing the bending strength of the legs 12a and 12b, the compressive load at an initial small strain increases. In this case, however, the flat portion in which the legs continue to buckle and break tends to shift toward the small strain side (leftward in the compression curve shown in FIG. 1) so that the compressive load $F_{60}$ at 60% strain tends to decrease. The interconnecting section 14 when positioned as described above serves to shift the flat portion in the compression curve toward the large strain side (rightward in the compression curve shown in FIG. 1).

The interconnecting section 14 preferably extends vertically and longitudinally. In this case, the interconnecting section 14 longitudinally extends continuously or intermittently with one or more gaps being defined between adjacent two components constituting the interconnecting section 14. The longitudinal length of the interconnecting section 14 preferably equals to 60–100% of the longitudinal length of the bumper core 100. When the interconnecting section 14 has a discontinuous structure, the longitudinal length thereof is a total length of components constituting the interconnecting section 14. It is desirable that the interconnecting section 14 extends throughout the longitudinal length of the core 100.

For reasons of easiness in fabrication, the interconnecting section 14 is preferably in the form of a plate having a vertical length ("n" in FIG. 7(e)) of preferably 10–100 mm, more preferably 20–60 mm, most preferably 20–40 mm, and a thickness ("m" in FIG. 7(e)) in the front-to-rear direction of preferably 4–30 mm, more preferably 5–20 mm, most preferably 5–15 mm. The interconnecting section 14 is not limited only to a plate-like form, however.

Incidentally, one or more interconnecting walls each similar to the above described interconnecting section 14 may be provided in the bumper core 10 described with reference to FIGS. 3(a) and 3(b) to interconnect adjacent two legs 12 at a position spaced apart rearwardly from the front section 13. In this case, the front section 13 may be provided with at least one aperture. Such a structure may become similar to the embodiments shown in FIGS. 6(a) to 6(c) and FIGS. 7(a) to 7(j), depending upon the position, number and shape of the aperture, leg and interconnecting section. For example, when the core 10 shown in FIG. 3(b) is provided with an interconnecting section to connect the inside two legs 15 at the rear ends thereof and an aperture is formed in the front section 13 at a position opposite the interconnecting section, then the resulting structure is similar to the core 100 shown in FIG. 6(b).

It is preferred that the volume, VV cm³, of the weight reducing portion (air space) 15b and 15a and the true volume, VT cm³, of the bumper core 100 satisfy the following condition:

$$0.2 \leq VT/(VT+VV) \leq 0.7$$

for reasons of satisfactory absorption of the energy of collision and reduced collision impact, likewise in the embodiment shown in FIGS. 3(a) and 3(b). More preferably, the ratio VT/(VT+VV) is between 0.2 and 0.6. Still more preferably, the ratio VT/(VT+VV) is between 0.2 and 0.5. Most preferably, the ratio VT/(VT+VV) is between 0.25 and 0.45.

It is preferred that the leg or legs 12a and/or 12b of the core have a ratio (H/T) of the length, H mm, in the front to rear direction to the thickness, T mm, in the vertical direction of 2 to 10, more preferably 3–8, most preferably 3–6, likewise in the embodiment shown in FIGS. 3(a) and 3(b). The length H is preferably 20–100 mm, more preferably 25–70 mm.

Figure 8:
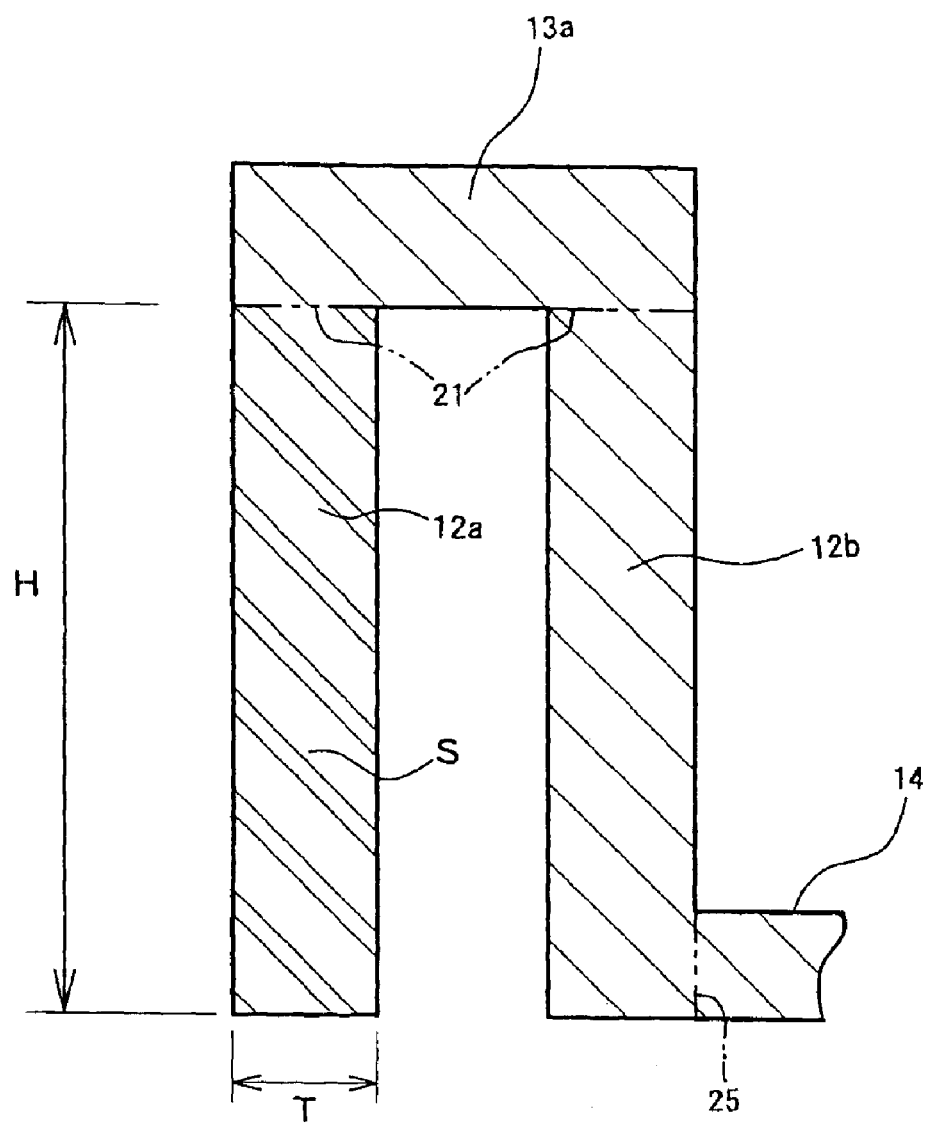
FIG. 8 is an enlarged fragmentary view of a portion of the bumper core shown in FIG. 6(b)

As shown in FIG. 8 which is an enlarged partial view of a portion surrounded by the one-dotted line in FIG. 6(b), the length H of the leg 12a is a length from the base position 21 to a rear end of the leg 12a. The thickness T of the leg 12a is a value obtained by dividing the cross-sectional area S (mm²) by the length H (T=S/H). The cross-sectional area S is an area of the portion indicated by the double line hatching in FIG. 8. It is possible that the H and/or T vary along the longitudinal length of the core. In such a case, it is preferred that the ratio H/T of each of the legs 12a and 12b fall within the above-described range in at least 60% of the longitudinal length thereof. In the embodiment shown in FIG. 8, the leg 12b has the same length H and thickness T as those of the leg 12a.

It is also preferred that the polyolefin-based resin-containing foam from which the legs 12a and 12b are formed have a bending load BF of 35–400 N, more preferably 35–200 N, most preferably 70–200 N, likewise in the embodiment shown in FIGS. 3(a) to 3(c).

It is further preferred that at least one of the legs 12a and 12b have a bending load BL of 5–150 N, more preferably 25–75 N, most preferably 30–70 N, for reasons of obtaining a suitable compressive load ratio $F_{20}/F_{40}$, $F_{60}/F_{40}$ and a compressive load $F_{40}$. The bending load BL of the leg is measured by 3-point bending test in accordance with the method and conditions described in the Japanese Industrial Standard JIS K 7221 (1984) in terms of the maximum bending load, as described above. However, the specimen should have a length of 120 mm and a width and a thickness of the leg as such. In the case of the leg 12b as shown in FIG. 8, for example, a specimen is obtained by cutting the core along the lines 21 and 25 and along the front-to-rear direction of the core such that the specimen has a length of 120 mm, a width of H and a thickness of T. The lengthwise direction of the specimen sampled is in parallel with the lengthwise direction of the core. The specimen thus obtained is subjected to the 3-point bending test as such, even when it has one or more tapered surfaces.

It is desired that at least one of the legs of the core have the H/T ratio, the bending loads BF and BL in the above ranges. It is more preferred that at least four legs of the core meet with the these criteria. It is most preferred that each of the legs of the core meet with the these criteria.

The front wall 13a of the core 100 preferably has such a shape as to coincide with a rear surface of a bumper fascia 18. However, the front wall 13a may have any desired shape such as flat, concave, convex or undulated form. If desired, the front wall 13a may be provided with one or more through holes, recesses or bores to form a part of the weight reducing portion of the core 100. The thickness and shape of the legs 12a and 12b may be suitably determined with due consideration of the compressive strength at an initial stage of collision (at low strain region) and easiness in preparation of the core such as moldability and mold releasability.

It is important that the bumper core be formed of a polyolefin-based resin foam having a density D2 of 0.045–0.2 g/cm³. Too low a density D2 below 0.045 g/cm³ is undesirable because the energy absorption is insufficient. A density D2 in excess of 0.2 g/cm³ is also undesirable because the compressive load $F_{40}$ at 40% strain is too high to reduce leg impact on the pedestrian. The density D2 is preferably 0.06–0.19 g/cm³, more preferably 0.075–0.19 g/cm³, most preferably 0.09–0.15 g/cm³. The density D2 of the bumper core is calculated by dividing the volume thereof by the weight thereof. The volume is measured by an immersion method in which a specimen is immersed in water to measure a difference between the water levels before and after the immersion, from which the volume can be determined.

The polyolefin-based resin for use in the bumper core may be, for example, a propylene-based resin such as a propylene homopolymer, a propylene-butene random copolymer, a propylene-butene block copolymer, an propylene-ethylene block copolymer, an propylene-ethylene random copolymer or an propylene-ethylene-butene random terpolymer; an ethylene-based resin such as a low density polyethylene, a medium density polyethylene, a high density polyethylene, a linear low density polyethylene, a linear very low density polyethylene, an ethylene-vinyl acetate copolymer, an ethylene-methyl methacrylate copolymer, an ionomer resin obtainable by inter-molecular crosslinking of an ethylene-methacrylic acid copolymer with a metal ion or an ethylene-acrylic acid-maleic anhydride terpolymer; polybutene-1 and polypentene. The polyolefin-based resin preferably contains at lest 30% by weight, more preferably at least 50% by weight, most preferably at least 80% by weight, of olefin components in the polymer chains thereof for reasons of good resilience, workability and recycling efficiency of the bumper core. The polyolefin-based resin is preferably a propylene-based resin.

It is also preferred that the polyolefin-based resin have a tensile modulus of at least 1,200 MPa, more preferably at least 1,350 MPa, most preferably at least 1,500 MPa, because a light weight and high rigidity bumper core having excellent energy absorption characteristics can be obtained. The upper limit of the tensile modulus is generally about 3,000 MPa. Most propylene homopolymers have such a high tensile modulus. Propylene copolymers having a high propylene content may also have such a high tensile modulus. The term "tensile modulus" as used herein is as measured in accordance with the Japanese Industrial Standard JIS K 7161(1994) using a specimen of a 1A shape (molded directly by injection molding) specified in JIS K 7162(1994) at a testing rate of 1 mm/minute.

If desired, the polyolefin-based resin may be used in conjunction with one or more other polymers as long as the object of the present invention is accomplished. Such additional polymers may be, for example, a polystyrene resin, a styrene elastomer, an olefin elastomer or an olefin rubber.

The bumper core of the polyolefin-based resin-containing foam is preferably prepared as a unitary body by molding expanded beads of a base resin containing the polypropylene-based resin in a mold. The expanded beads may be prepared by any suitable known method.

The following examples will further illustrate the present invention.

EXAMPLE 1

Figure 9A:
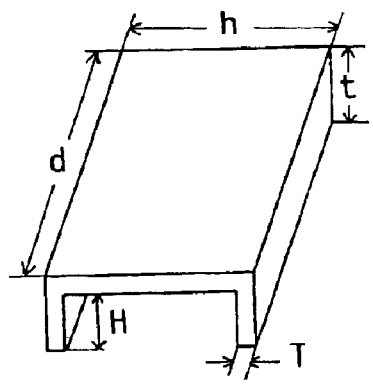
FIGS. 9(a) through 9(h) are perspective views diagrammatically illustrating bumper core specimens prepared and tested in the examples and comparative examples.

Expanded beads (apparent density D1: 0.14 g/cm³) of a propylene homopolymer resin having a tensile modulus of 1,440 MPa were filled in a mold and heated with steam to obtain a foamed molding in the form of a bumper core having a maximum length L in the front-to-rear direction of 38 mm. The core was composed of a front wall, and two, parallel plate-like legs extended rearwardly from the front wall and also lengthwise of the core. From the essential portion of the thus obtained core were cut out specimens as shown in FIG. 9(a) each having a length "d" of 170 mm in the lengthwise direction of the core, the length "t" of 38 mm in the front-to-rear direction of the core and a vertical length "h" of 100 mm along the vertical direction of the core. Each specimen had two legs with a length H in the front-to-rear direction of 32 mm and a thickness T in the vertical direction of 8 mm. The specimens were measured for a compressive load $F_{20}$ at 20% strain, a compressive load $F_{40}$ at 40% strain, a compressive load $F_{60}$ at 60% strain, a true volume VT and a volume VV of the weight reducing portion, from which $F_{20}/F_{40}$, $F_{60}/F_{40}$ and VT/(VT+VV) were calculated. Also measured was the density D2 of the foamed molding, bending load BL of the leg and the bending load BF of the foam from which the leg was formed. The results are summarized in Tables 1 and 2.

The apparent density (D1) of the expanded beads is obtained by dividing the volume (V1) thereof by the weight (W1) thereof (D1=W1/V1). The volume (V1) is measured by an immersion method in which more than 500 expanded beads (weight W1), which have been allowed to stand at 23° C. for 48 hours in the atmosphere under a relative humidity of 50%, are immersed in water contained in a graduation cylinder. From the increment of the volume, the volume (V1) can be determined.

EXAMPLE 2

Figure 9B:
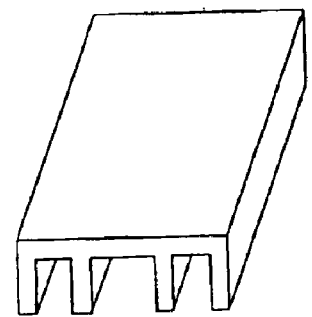

Using the same expanded beads as used in Example 1, a bumper core was molded in the same manner as in Example 1 having a maximum length L in the front-to-rear direction of 38 mm. The core was composed of a front wall, and four, parallel, equally spaced apart plate-like legs extending rearwardly from the front wall and also lengthwise of the core. From the essential portion of the thus obtained core were cut out specimens as shown in FIG. 9(b) each having a length "d" of 170 mm in the lengthwise direction of the core, the length "t" of 38 mm in the front-to-rear direction of the core and a vertical length "h" of 100 mm along the vertical direction of the core. Each specimen had four legs with a length H in the front-to-rear direction of 32 mm and a thickness T in the vertical direction of 8 mm. The $F_{20}$, $F_{40}$, $F_{60}$, $F_{20}/F_{40}$, $F_{60}/F_{40}$, VT/(VT+VV) and D2 of the core and bending loads BL and BF of the leg are shown in Tables 1 and 2.

EXAMPLE 3

Figure 9C:
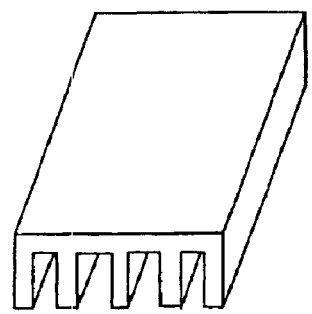

Using the same expanded beads as used in Example 1, a bumper core was molded in the same manner as in Example 1 having a maximum length L in the front-to-rear direction of 38 mm. The core was composed of a front wall, and five, parallel, equally spaced apart plate-like legs extending rearwardly from the front wall and also lengthwise of the core. From the essential portion of the thus obtained core were cut out specimens as shown in FIG. 9(c) each having a length "d" of 170 mm in the lengthwise direction of the core, the length "t" of 38 mm in the front-to-rear direction of the core and a vertical length "h" of 100 mm along the vertical direction of the core. Each specimen had five legs with a length H in the front-to-rear direction of 32 mm and a thickness T in the vertical direction of 8 mm. The $F_{20}$, $F_{40}$, $F_{60}$, $F_{20}/F_{40}$, $F_{60}/F_{40}$, VT/(VT+VV) and D2 of the core and bending loads BL and BF of the leg are shown in Tables 1 and 2.

EXAMPLE 4

Example 2 was repeated in the same manner as described except that expanded beads (apparent density D1: 0.076 g/cm³) of a propylene-ethylene random copolymer resin having a tensile modulus of 1,120 MPa were used for the preparation of a molded bumper core having a maximum length L in the front-to-rear direction of 38 mm. The core was composed of a front wall, and four, parallel, equally spaced apart plate-like legs extending rearwardly from the front wall and also lengthwise of the core. From the essential portion of the thus obtained core were cut out specimens as shown in FIG. 9(b) each having a length "d" of 170 mm in the lengthwise direction of the core, the length "t" of 38 mm in the front-to-rear direction of the core and a vertical length "h" of 100 mm along the vertical direction of the core. Each specimen had four legs with a length H in the front-to-rear direction of 32 mm and a thickness T in the vertical direction of 8 mm. The $F_{20}$, $F_{40}$, $F_{60}$, $F_{20}/F_{40}$, $F_{60}/F_{40}$, VT/(VT+VV) and D2 of the core and bending loads BL and BF of the leg are shown in Tables 1 and 2.

EXAMPLE 5

Example 2 was repeated in the same manner as described except that the thickness T was increased to 12 mm. The $F_{20}$, $F_{40}$, $F_{60}$, $F_{20}/F_{40}$, $F_{60}/F_{40}$, VT/(VT+VV) and D2 of the core and bending loads BL and BF of the leg are shown in Tables 1 and 2.

EXAMPLE 6

Expanded beads (apparent density D1: 0.16 g/cm³) of a propylene-ethylene random copolymer resin having a tensile modulus of 1,120 MPa were filled in a mold and heated with steam to obtain a foamed molding in the form of a bumper core having a maximum length L in the front-to-rear direction of 38 mm. The core was composed of a front wall, and four, parallel, equally spaced apart plate-like legs extending rearwardly from the front wall and also lengthwise of the core. From the essential portion of the thus obtained core were cut out specimens as shown in FIG. 9(b) each having a length "d" of 170 mm in the lengthwise direction of the core, the length "t" of 38 mm in the front-to-rear direction of the core and a vertical length "h" of 100 mm along the vertical direction of the core. Each specimen had four legs with a length H in the front-to-rear direction of 32 mm and a thickness T in the vertical direction of 9 mm. The $F_{20}$, $F_{40}$, $F_{60}$, $F_{20}/F_{40}$, $F_{60}/F_{40}$, VT/(VT+VV) and D2 of the core and bending loads BL and BF of the leg are shown in Tables 1 and 2.

EXAMPLE 7

Figure 9D:
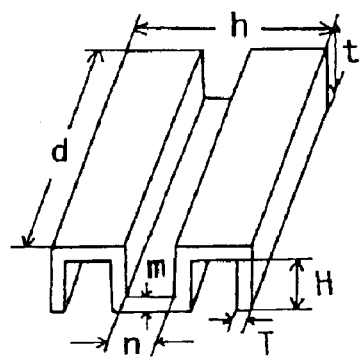

Expanded beads (apparent density D1: 0.16 g/cm³) of a propylene homopolymer resin having a tensile modulus of 1,440 MPa were filled in a mold and heated with steam to obtain a foamed molding in the form of a bumper core. The core had two vertically spaced apart U-shaped sections each formed by a vertical front wall extending lengthwise of the bumper core and two legs extending longitudinally and also rearwardly from the vertical front wall to define between adjacent two legs a space which is open rearwardly. The core had an interconnecting section connecting adjacent two legs of the adjacent two U-shaped sections at rear ends of the legs so that the U-shaped sections are interconnected together into a unitary structure. From the essential portion of the thus obtained core were cut out specimens as shown in FIG. 9(d) each having a length "d" of 170 mm in the lengthwise direction of the core, the length "t" of 38 mm in the front-to-rear direction of the core and a vertical length "h" of 100 mm along the vertical direction of the core. Each specimen had four legs with a length H in the front-to-rear direction of 32 mm and a thickness T in the vertical direction of 9 mm. The interconnecting section was in the form of a rectangular plate having a vertical length "n" of 20 mm and a thickness "m" in the front-to-rear direction of 6 mm. The specimens were measured for a compressive load $F_{20}$ at 20% strain, a compressive load $F_{40}$ at 40% strain, a compressive load $F_{60}$ at 60% strain, a true volume VT and a volume VV of the weight reducing portion, from which $F_{20}/F_{40}$, $F_{60}/F_{40}$, VT/(VT+VV) were calculated. Also measured were the density D2 of the core, the bending load BL of the leg and the bending load BF of the foam. The results are summarized in Tables 1 and 2.

EXAMPLE 8

Figure 9E:
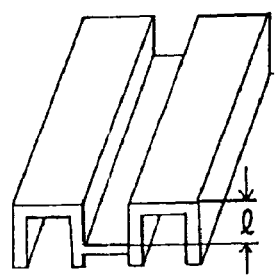

Example 7 was repeated in the same manner as described except that the interconnecting section was located at a position spaced apart from the foremost plane of the core a distance equal to three quarters of the distance between the foremost plane and the rearmost plane of the core (namely, the length l between the foremost plane and the front face of the interconnecting section in FIG. 9(e) was 38×¾ (=28.5) mm). The $F_{20}$, $F_{40}$, $F_{60}$, $F_{20}/F_{40}$, $F_{60}/F_{40}$, VT/(VT+VV) and D2 of the core and bending loads BL and BF of the leg are shown in Tables 1 and 2.

COMPARATIVE EXAMPLE 1

Figure 9F:
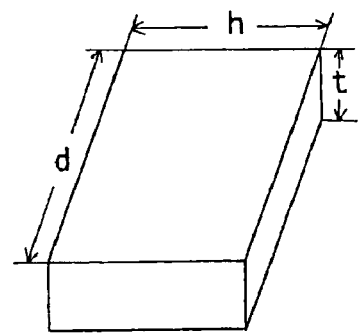

Expanded beads (apparent density D1: 0.13 g/cm$^3$) of a propylene homopolymer resin having a tensile modulus of 1,440 MPa were filled in a mold and heated with steam to obtain a foamed molding in the form of a rectangular parallelepiped as shown in FIG. 9(f) having a thickness "t" of 38 mm, a length "d" of 170 mm and a width "h" of 100 mm. The $F_{20}$, $F_{40}$, $F_{60}$, $F_{20}/F_{40}$, $F_{60}/F_{40}$, VT/(VT+VV) and D2 and bending load BF of the foam are shown in Tables 1 and 2. The compression test was carried out in a manner as shown in FIGS. 2(a) and 2(b). Thus, the foam was compressed in the thickness direction with the axis of a pipe (jig) 2 being oriented in the direction perpendicular to the lengthwise of the foam.

COMPARATIVE EXAMPLE 2

Comparative Example 1 was repeated in the same manner as described except that expanded beads (apparent density D1: 0.059 g/cm$^3$) of a propylene homopolymer resin having a tensile modulus of 1,440 MPa were molded to form a foamed molding in the form of a rectangular parallelepiped as shown in FIG. 9(f) having a thickness "t" of 38 mm, a length "d" of 170 mm and a width "h" of 100 mm. The foamed molding had a density of 0.039 g/cm$^3$. The $F_{20}$, $F_{40}$, $F_{60}$, $F_{20}/F_{40}$, $F_{60}/F_{40}$, VT/(VT+VV) and D2 and bending load BF of the foam are shown in Tables 1 and 2.

COMPARATIVE EXAMPLE 3

Example 1 was repeated in the same manner as described except that the thickness T of the leg in the vertical direction was increased to 20 mm. The $F_{20}$, $F_{40}$, $F_{60}$, $F_{20}/F_{40}$, $F_{60}/F_{40}$, VT/(VT+VV) and D2 of the core and bending loads BL and BF of the leg are shown in Tables 1 and 2.

COMPARATIVE EXAMPLE 4

Figure 9G:
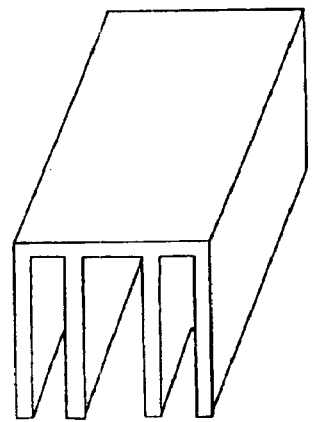

Example 2 was repeated in the same manner as described except that the maximum length L was increased to 100 mm and that the length H of the leg in the front-to-rear direction was increased to 94 mm. The specimen of the core had a shape as shown in FIG. 9(g). The $F_{20}$, $F_{40}$, $F_{60}$, $F_{20}/F_{40}$, $F_{60}/F_{40}$, VT/(VT+VV) and D2 of the core and bending loads BL and BF of the leg are shown in Tables 1 and 2.

COMPARATIVE EXAMPLE 5

Example 2 was repeated in the same manner as described except that the expanded beads had an apparent density D1: 0.059 g/cm$^3$ and that the propylene-ethylene random copolymer resin had a tensile modulus of 1,120 MPa. The $F_{20}$, $F_{40}$, $F_{60}$, $F_{20}/F_{40}$, $F_{60}/F_{40}$, VT/(VT+VV) and D2 of the core and bending loads BL and BF of the leg are shown in Tables 1 and 2.

COMPARATIVE EXAMPLE 6

Figure 9H:
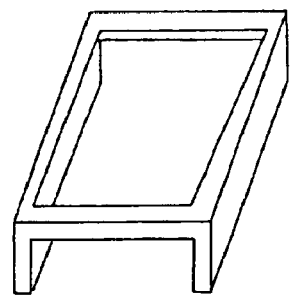

Example 1 was repeated in the same manner as described except that the maximum length L was increased to 44 mm, that the length H of the leg in the front-to-rear direction was increased to 38 mm and that apertures were formed in the front wall. Thus, the core was composed of a front wall, and two parallel plate-like legs extended rearwardly from the front wall and also lengthwise of the core. The front wall was then cut to form apertures arranged along the lengthwise of the core and spaced apart from each other a distance of 40 mm, with each aperture having a length in the lengthwise direction of the core of 150 mm and a width in the vertical direction of the core of 84 mm. From the essential portion of the thus obtained core were cut out specimens as shown in FIG. 9(h) each having a length "d" of 170 mm in the lengthwise direction of the core, the length "t" of 44 mm in the front-to-rear direction of the core and a vertical length "h" of 100 mm along the vertical direction of the core. Each specimen had two plate-like legs with a length H in the front-to-rear direction of 38 mm and a thickness T in the vertical direction of 8 mm. The $F_{20}$, $F_{40}$, $F_{60}$, $F_{20}/F_{40}$, $F_{60}/F_{40}$, VT/(VT+VV) and D2 of the core and bending loads BL and BF of the leg are shown in Tables 1 and 2.

TABLE 1

| Example | Apparent Density D1 of Beads (g/cm$^3$) | Density D2 of Core (g/cm$^3$) | VT/(VT + VV) | Leg | | | | Connecting Section | |
|---|---|---|---|---|---|---|---|---|---|
| | | | | Number | Length H (mm) | Thickness T (mm) | H/T | Thickness m (mm) | Vertical length n (mm) |
| 1 | 0.14 | 0.099 | 0.29 | 2 | 32 | 8 | 4 | — | — |
| 2 | 0.14 | 0.099 | 0.43 | 4 | 32 | 8 | 4 | — | — |
| 3 | 0.14 | 0.099 | 0.50 | 5 | 32 | 8 | 4 | — | — |
| 4 | 0.076 | 0.051 | 0.43 | 4 | 32 | 8 | 4 | — | — |
| 5 | 0.14 | 0.099 | 0.56 | 4 | 32 | 12 | 2.7 | — | — |
| 6 | 0.16 | 0.113 | 0.46 | 4 | 32 | 9 | 3.6 | — | — |
| 7 | 0.16 | 0.113 | 0.46 | 4 | 32 | 9 | 3.6 | 6 | 20 |
| 8 | 0.16 | 0.113 | 0.46 | 4 | 32 | 9 | 3.6 | 6 | 20 |
| Comp. 1 | 0.13 | 0.090 | 1 | — | — | — | — | — | — |
| Comp. 2 | 0.059 | 0.039 | 1 | — | — | — | — | — | — |
| Comp. 3 | 0.14 | 0.099 | 0.50 | 2 | 32 | 20 | 1.6 | — | — |
| Comp. 4 | 0.14 | 0.099 | 0.36 | 4 | 94 | 8 | 11.8 | — | — |
| Comp. 5 | 0.059 | 0.039 | 0.43 | 4 | 32 | 8 | 4 | — | — |
| Comp. 6 | 0.14 | 0.099 | 0.17 | 2 | 38 | 8 | 4.8 | — | — |

TABLE 2

| Example | Foam BF (N) | Core BL (N) | $F_{20}$ (kN) | $F_{40}$ (kN) | $F_{60}$ (kN) | $F_{20}/F_{40}$ | $F_{60}/F_{40}$ |
|---|---|---|---|---|---|---|---|
| 1 | 120 | 32 | 1.02 | 1.16 | 1.03 | 0.88 | 0.89 |
| 2 | 120 | 32 | 2.26 | 2.74 | 2.96 | 0.82 | 1.08 |
| 3 | 120 | 32 | 2.68 | 3.24 | 3.72 | 0.83 | 1.15 |
| 4 | 45 | 6 | 0.50 | 0.65 | 0.80 | 0.77 | 1.23 |
| 5 | 120 | 63 | 3.23 | 4.64 | 5.90 | 0.70 | 1.27 |
| 6 | 138 | 48 | 3.26 | 4.01 | 3.69 | 0.81 | 0.92 |
| 7 | 138 | 48 | 2.96 | 3.86 | 4.07 | 0.77 | 1.05 |
| 8 | 138 | 48 | 3.00 | 4.08 | 4.29 | 0.74 | 1.05 |
| Comp. 1 | 106 | — | 5.13 | 7.91 | 10.66 | 0.65 | 1.35 |
| Comp. 2 | 40 | — | 1.46 | 2.24 | 2.96 | 0.65 | 1.32 |
| Comp. 3 | 120 | 153 | 2.78 | 4.11 | 5.54 | 0.68 | 1.35 |
| Comp. 4 | 120 | 54 | 0.73 | 0.01 | 0.14 | 73 | 14 |
| Comp. 5 | 32 | 4 | 0.46 | 0.58 | 0.70 | 0.79 | 1.13 |
| Comp. 6 | 120 | 38 | 0.97 | 0.97 | 0.01 | 1.00 | 0.01 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Applications No. 2002-249532, filed Aug. 28, 2002 and No. 2002-332583, filed Nov. 15, 2002, inclusive of the specifications, claims and drawings, are hereby incorporated by reference herein.

What is claimed is:

1. An elongated bumper core of a polyolefin-based resin-containing foam having a density of 0.045–0.2 g/cm³ and showing a compressive load of $F_{20}$ at 20% strain, a compressive load of $F_{40}$ at 40% strain and a compressive load of $F_{60}$ at 60% strain when compressed by a rigid pipe having an outer diameter of 70 mm at a compression speed of 500 mm/minute, wherein the ratio $F_{20}/F_{40}$ is in the range of 0.6–1.3 and the ratio $F_{60}/F_{40}$ is in the range of 0.75–1.3.

2. The bumper core as claimed in claim 1, wherein the compressive load $F_{40}$ is in the range of 1–6 kN.

3. The bumper core as claimed in claim 1, having a true volume VT cm³, and including one or more weight reducing portions having a total volume of VV cm³, wherein VT and VV satisfy the following condition:

$$0.2 \leq VT/(VT+VV) \leq 0.7.$$

4. The bumper core as claimed in claim 1, including a front section extending lengthwise of said bumper core, and at least two, longitudinally extending, vertically spaced apart protrusions each extending rearwardly from said front section, wherein each of said protrusions has a thickness in the vertical direction of T mm and a length in the front to rear direction of H mm, wherein the ratio of H/T is 2 to 10, and wherein the polyolefin-based resin-containing foam from which said protrusions are formed has a bending load of 35–400 N.

5. The bumper core as claimed in claim 1, including at least two, vertically spaced apart U-shaped sections each formed by a vertical front wall extending lengthwise of said bumper core and at least two legs extending longitudinally and also rearwardly from said vertical front wall to define between adjacent two legs a space which is open rearwardly; and an interconnecting section connecting adjacent two legs of each of the two adjacent U-shaped sections at a position spaced apart rearwardly from at least one of said front walls of said adjacent two U-shaped sections so that the U-shaped sections are interconnected together into a unitary structure.

6. The bumper core as claimed in claim 5, having a foremost plane in which at least one of said front walls of said U-shaped sections is located and a rearmost plane in which a rear end of at least one of said legs of said U-shaped sections is located, and wherein said interconnecting section is located at a position spaced apart from said foremost plane a distance equal to at least one thirds of the distance between said foremost plane and said rearmost plane.

7. The bumper core as claimed in claim 6, wherein said interconnecting section is located at said rearmost plane.

8. The bumper core as claimed in claim 5, wherein said interconnecting section extends vertically and longitudinally.

9. The bumper core as claimed in claim 5, wherein each of said legs has a thickness in the vertical direction of T mm and a length in the front to rear direction of H mm, and wherein the ratio of H/T is 2 to 10.

10. The bumper core as claimed in claim 1, wherein said polyolefin-based resin is a polypropylene-based resin.

11. The bumper core as claimed in claim 10, wherein said polypropylene-based resin has a tensile modulus of at least 1,200 MPa.

12. The bumper core as claimed in claim 10, obtained by molding expanded beads of the polypropylene-based resin in a mold.

13. An elongated bumper core of a polyolefin-based resin-containing foam having a density of 0.045–0.2 g/cm³, comprising a front section extending lengthwise of said bumper core, and at least two, longitudinally extending, vertically spaced apart protrusions each extending rearwardly from said front section, wherein each of said protrusions has a thickness in the vertical direction of T mm and a length in the front to rear direction of H mm, wherein the ratio of H/T is 2 to 10, wherein the polyolefin-based resin-containing foam from which said protrusions are formed has a bending load of 35–400 N, said bumper core having a true volume VT cm³ and including one or more weight reducing portions having a total volume of VV cm³, wherein VT and VV satisfy the following condition:

$$0.2 \leq VT/(VT+VV) \leq 0.7.$$

14. The bumper core as claimed in claim 13, further comprising at least one interconnecting section connecting adjacent two legs at a position spaced apart rearwardly from said front section, and at least one aperture formed in said front section.

15. An elongated bumper core of a polyolefin-based resin-containing foam having a density of 0.045–0.2 g/cm³, comprising at least two, vertically spaced apart U-shaped sections each formed by a vertical front wall extending lengthwise of said bumper core and at least two legs extending longitudinally and also rearwardly from said vertical front wall to define between adjacent two legs a space which is open rearwardly; and an interconnecting section connecting adjacent two legs of each of the two adjacent U-shaped sections at a position spaced apart rearwardly from at least one of said front walls of said adjacent two U-shaped sections so that the U-shaped sections are interconnected together into a unitary structure.

16. The bumper for attachment to a front of a vehicle, comprising a bumper fascia, a bumper core according to claim 1 having a front side attached to said bumper fascia, and a reinforcement to which a rear side of the bumper core is attached.

17. The bumper for attachment to a front of a vehicle, comprising a bumper fascia, a bumper core according to claim 13 having a front side attached to said bumper fascia, and a reinforcement to which a rear side of the bumper core is attached.

18. The bumper for attachment to a front of a vehicle, comprising a bumper fascia, a bumper core according to claim 15 having a front side attached to said bumper fascia, and a reinforcement to which a rear side of the bumper core is attached.

* * * * *